(12) United States Patent
Buelow

(10) Patent No.: US 8,894,419 B1
(45) Date of Patent: Nov. 25, 2014

(54) MAGNETICALLY CONNECTED UNIVERSAL COMPUTER POWER ADAPTER

(75) Inventor: Todd M. Buelow, Chanhassen, MN (US)

(73) Assignee: BBY Solutions, Inc., Richfield, MN (US)

( * ) Notice: Subject to any disclaimer, the term of this patent is extended or adjusted under 35 U.S.C. 154(b) by 0 days.

(21) Appl. No.: 13/618,940

(22) Filed: Sep. 14, 2012

Related U.S. Application Data

(60) Provisional application No. 61/682,989, filed on Aug. 14, 2012.

(51) Int. Cl.
  *H01R 11/30* (2006.01)
  *H01R 13/62* (2006.01)
(52) U.S. Cl.
  CPC .................................. *H01R 13/6205* (2013.01)
  USPC .............................................. 439/39; 439/218
(58) Field of Classification Search
  USPC ..................... 439/39, 218, 219, 176, 221–223
  See application file for complete search history.

(56) References Cited

U.S. PATENT DOCUMENTS

| | | | | |
|---|---|---|---|---|
| 6,981,895 B2 * | 1/2006 | Potega | ........................... | 439/578 |
| 7,311,526 B2 * | 12/2007 | Rohrbach et al. | ............... | 439/39 |
| 7,726,973 B1 * | 6/2010 | Perry | ............... | 439/39 |
| 7,874,844 B1 * | 1/2011 | Fitts, Jr. | ........................... | 439/39 |
| 7,967,609 B2 * | 6/2011 | Capece et al. | ........................... | 439/39 |
| 8,105,091 B2 * | 1/2012 | Nishihira et al. | ............... | 439/39 |
| 8,398,409 B2 * | 3/2013 | Schmidt | ........................... | 439/39 |
| 8,469,730 B2 * | 6/2013 | Garb et al. | ........................... | 439/173 |
| 2005/0032405 A1 * | 2/2005 | Wu | ............... | 439/176 |
| 2007/0259536 A1 * | 11/2007 | Long et al. | ........................... | 439/39 |
| 2008/0096398 A1 * | 4/2008 | Rohrbach et al. | ............... | 439/39 |
| 2010/0311261 A1 * | 12/2010 | Lee | ............... | 439/223 |
| 2011/0143556 A1 * | 6/2011 | Hsu | ............... | 439/39 |

* cited by examiner

*Primary Examiner* — Gary Paumen
(74) *Attorney, Agent, or Firm* — Beck & Tysver PLLC

(57) ABSTRACT

A magnetically connected universal computer power adapter is presented. The computer power adapter provides a power supply, a power cord, a cord connector, and a charging plug. The cord connector and charging plug each contain a magnet that magnetically couple the cord connector to the charging plug. The cord connector may couple with more than one type of charging plug, allowing the universal computer power adapter to be used with many different computer models.

16 Claims, 5 Drawing Sheets

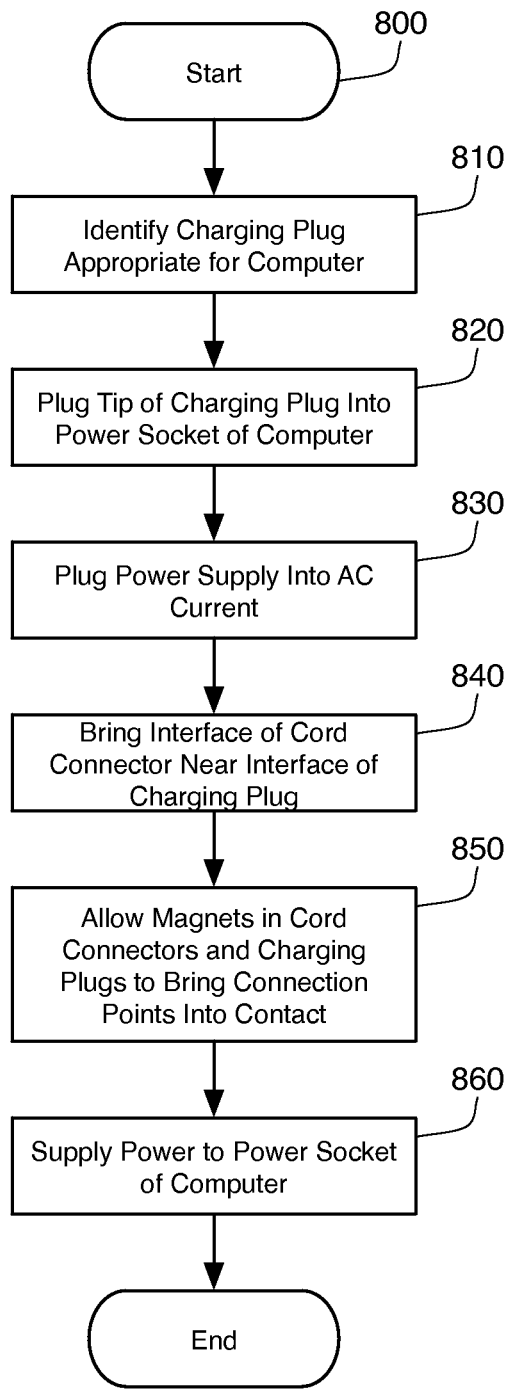

MAGNETICALLY CONNECTED UNIVERSAL COMPUTER POWER ADAPTER

RELATED APPLICATION

The present application claims the benefit of U.S. Provisional Application 61/682,989, filed Aug. 14, 2012, which is hereby incorporated by reference.

FIELD OF THE INVENTION

The present application relates to the field of universal computer power adapters. More particularly, the described embodiments relate to a universal computer power adapter having a magnetic connection between a universal power cord assembly and a plurality of charging plugs.

SUMMARY

The disclosed embodiments provide a universal computer power adapter having a power supply, a cord, a cord magnetic connector, and a plurality of magnetic charging plugs. The charging plugs utilize tips that can be inserted into power sockets of electronic devices. These tips can be of standard sizes that fit numerous electronic devices, or can be configured into a non-standard, proprietary arrangement that is particularly designed to fit one product or a line of products from a single manufacturer. The universal computer power adapter shown and described herein provides a method allowing for computer power connections where the components quickly align to engage and disengage with an adequate amount of force for convenience and safety.

BRIEF DESCRIPTION OF THE DRAWINGS

FIG. 8 is a flow chart illustrating a method for using a magnetic charging plug and cord connector.

DETAILED DESCRIPTION

Figure 1:
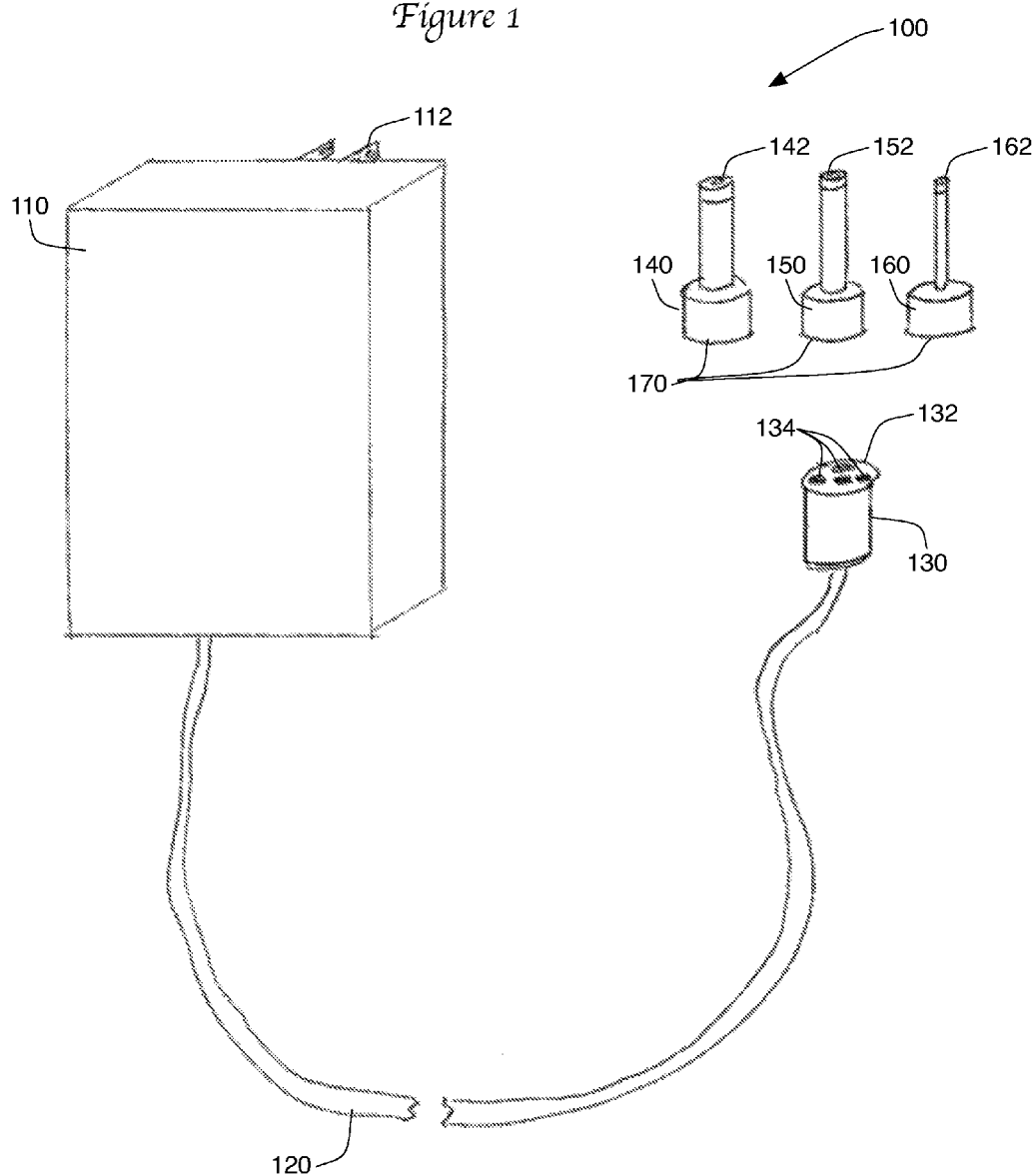
FIG. 1 is a perspective view of a universal computer power adapter and a plurality of charging plugs.

FIG. 1 shows a universal computer power adapter 100. The adapter 100 includes a power supply 110, a cord 120, and a cord connector 130. Power supply 110 may be a variable voltage power supply in order to expand the number of devices that the power adapter 100 can power and charge. In the preferred embodiment, the power supply 110 includes a sensor that automatically adjusts the output voltage according to the requirements of the attached device. For example, the power supply may observe the current draw by the attached device at a first voltage level, and adjust the voltage if the current draw does not match expectations for that voltage level. Alternatively, a sliding switch could be placed on the external case of the power supply 110 that allows the user to change the output voltage of the power supply by sliding the switch to the correct position. The power supply 110 further includes a plug 112 to plug into an AC power outlet. The plug 112 may be directly attached to the power supply 110, or can be attached to the power outlet with an AC power cord (not shown). In the preferred embodiment, the power supply 110 accepts AC power from the plug 112 and outputs a DC voltage for powering an attached device. The cord connector 130 on the end of the cord 120 has a combined magnetic/electrical connection interface 132 for magnetically and electrically coupling with one of a plurality of electrical device power charging plugs 140, 150, and 160.

Each plug 140, 150, 160 is designed with a charger magnetic connection interface 170 at one end of the plug 140, 150, 160 that cooperates with the interface 132 on the cord connector 130. Opposite the plug interface 170 on each plug 140, 150, and 160 is a plug tip 142, 152, and 162, respectively. Each of the tips 142, 152, and 162 is customized to fit different power socket of a computer or other electrical device. The user of the power adapter 100 selects the plug 140, 150, or 160 that is appropriate for their computer model and inserts the selected tip 142, 152, 162 into the charging input interface, or power socket, of their computer. The cord connector 130 is then attached to the selected plug 140, 150, or 160, such that the cord connector interface 132 is cooperatively engaged with the interface 170 of the plug 140, 150, or 160. This allows the universal adapter 100 to charge a large variety of different computer models.

The engagement between cord connector interface 132 and plug interface 170 is both magnetic and electric. Magnets are located in both interfaces 132, 170 with appropriate polarities such that the magnets attract one another and hold the interfaces 132, 170 together. As the magnets hold these two interfaces 132, 170 together, an electrical connection is also made. The connection includes at least two separate connections allowing power to flow from the power supply 110 and the plug tip 142, 152, or 162 as needed to charge the computer. In other embodiments, three or more separate electrical connections are made between the cord connector 130 and the plug 140, 150, or 160. These additional connections allow data communications to occur in addition to the supply of power. Such data communications may be between the plug 140, 150, or 160 and the power supply 110, which would allow the power supply 110 to vary the voltage provided to the computer depending upon which plug 140, 150, or 160 is attached to the cord connector 130. The data communication may also be between the power supply and the computer attached to the plug 140, 150, or 160. In these cases, the plug tips 142, 152, 162 must include both power connectors to the computer as well as data connectors with the computer.

In FIG. 1, the interface 132 of the cord connector 130 is shown with four separate, visible connection points or pins 134. In the preferred embodiment, the plug interface 170 has a similar number and arrangement of connection points, although these are not shown in FIG. 1. As disclosed above, at least two of these pins or connection points carry electrical power between the power supply 110 and the plug tips 142, 152, 162. The magnets that hold the interfaces 132, 170 together can be located directly on the face of the interfaces 132, 170. Alternatively, the magnets can be located behind the physical face of the interface 132, 170, as long as the magnets present a sufficient magnetic field from the appropriate pole of the magnet through the interface 132, 170 so as to allow an attractive magnetic force to be felt by a cooperative magnet in the other interface 170, 132. In an alternative embodiment, a magnet is found in only one of the interfaces 132, 170, and a ferromagnetic material that is attracted to that magnet is found on the other interface 170, 132.

Figure 2:
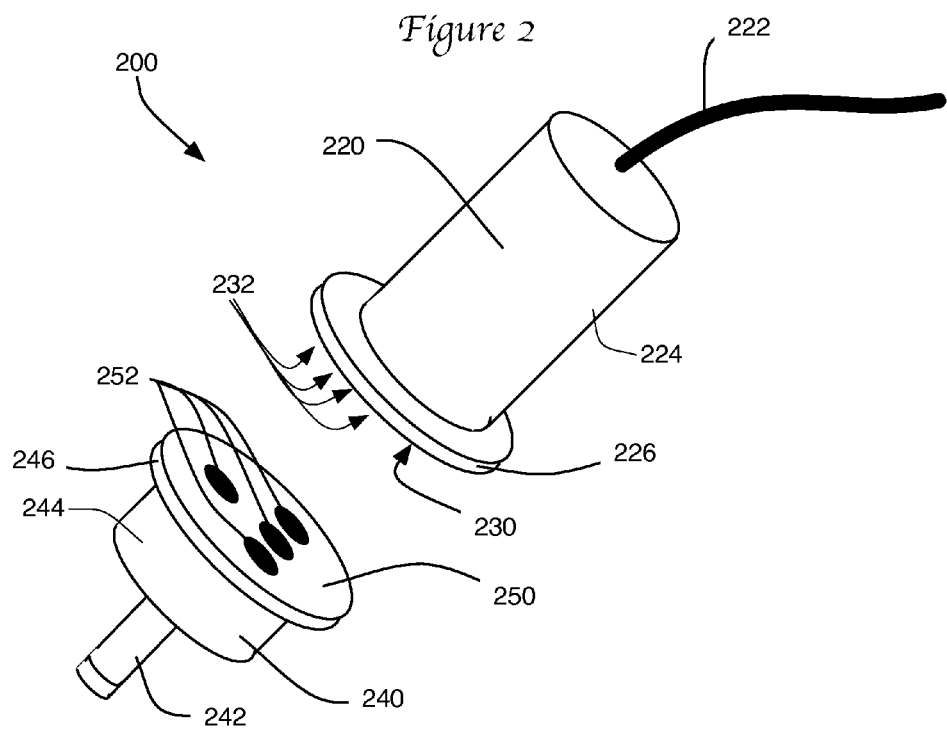
FIG. 2 is a perspective view of a first embodiment of a magnetic charging plug and cord connector.

FIG. 2 shows one arrangement of a coupling 200 for universal computer power adapter 100 in more detail. This coupling 200 consists of both a cord connector 220 and charging plug 240. The cord connector 220 is connected to a cord 222 that provides an electrical connection to a power supply (not shown), while the charging plug 240 includes a tip 242 adapted to be received into the power socket of a computer (also not shown). Both the cord connector 220 and the charging plug 240 have connection interfaces 230 and 250 respectively. Interfaces 230, 250 are generally the same size and shape. In the embodiment shown in FIG. 2, both the cord connector 220 and the charging plug 240 are constructed with a main cylindrical portion 224, 244, respectively, and a lip portion 226, 246, respectively. The expansion of the cord connector 220 and charging plug 240 at the lips 226, 246 provides a larger surface for the connection interfaces 230 and 250 than if the cylindrical portions 224, 244 simply continued to the interfaces 230, 250 without the lips 226, 246. In addition, the lips 226, 246 can help provide a gripping surface to facilitate manual removal of charging plug 240 from a power socket of a computer. It is also possible to provide the lips 226, 246 on only one of the cord connector 220 and charging plug 240, which could help in the manual separation of these two components. Alternately, or in addition, cylindrical portions 224, 244 may be contoured or textured to provide sufficient grip for removal.

Four pins or connection points 252 are shown on the interface 250 of the charging plug 240. A similar configuration of connection points 232 (not shown) is found on the interface 230 of the cord connector 220. In one embodiment, these connection points 252 are magnets located directly on the surface of interfaces 230, 250. The magnets 232 on the cord connector interface 230 are paired but with opposite exposed polarities in the same configuration as the magnets 252 on the charging plug interface 250. In this way, the connection points 232, 252 are mutually magnetically attractive and provide a magnetic connection between charging plug 240 and cord connector 220. Magnets 232, 252 may be magnetically charged conductors that provide both a retention force between interfaces 230, 250 and a conduit for electricity to the plug tip 242. The retention force of the magnets is light enough to allow quick and easy disconnect for ease of use and safety; for example, the retention force is preferably optimized to cause the interfaces 230, 250 to uncouple in the case of tripping over power cord 222. Magnets 232 are preferably distributed on interface 230 as a mirror image of the distribution of magnets 252 so that magnets 232, 252 line up evenly when interfaces 230, 250 are in contact. As shown in FIG. 2, Magnets 252 may be distributed asymmetrically on interface 250. In this embodiment, cord connector 220 is only able to align in one rotational position with respect to charging plug 240. If a user attempts to align the cord connector 220 with the charging plug 240 in a different rotational position, the magnets 232, 252 will resist the connection. In an alternate embodiment, magnets 232, 252 may be aligned in an axially symmetric manner, allowing interfaces 230, 250 to align in more than one rotational alignment, as is described in more detail in connection with FIG. 5.

When all of the connection points 252 are physical magnets, these magnets 252 are used to both hold the cord connector 220 and the charging plug 240 together, and also to conduct power and data between the cord 222 running to the power supply and the charging plug tip 242 that interfaces with the computer. In one embodiment, the magnets 232, 252 are rare earth magnets such as neodymium magnets. While neodymium does conduct electricity, it has a higher resistivity than other metals such as copper and gold. As a result, in one embodiment the connection points 252 are neodymium magnets that are coated with a conductive metal such as copper, silver, gold, or nickel, or some similarly conductive alloy in order to reduce electrical resistance.

In other embodiments, not all of the connection points 252 are physical magnets. For instance, two of the connection points 252 can be magnets with opposite exposed polarities, while the other two connection points 252 can be non-magnetized electrical connectors that pass power between the cord connector 220 and the charging plug 240. The use of two magnets of sufficient power can ensure that the cord connector 220 and the charging plug 240 are held connected with sufficient force to complete an electrical connection on the other two connection points 252. By exposing opposite polarities appropriately on the two magnetic connection points 252 and the corresponding connection points 232 on the cord connector 220, the arrangement of polarities will also ensure that the connection will only occur when the two components 220, 240 are properly aligned.

Figure 3:
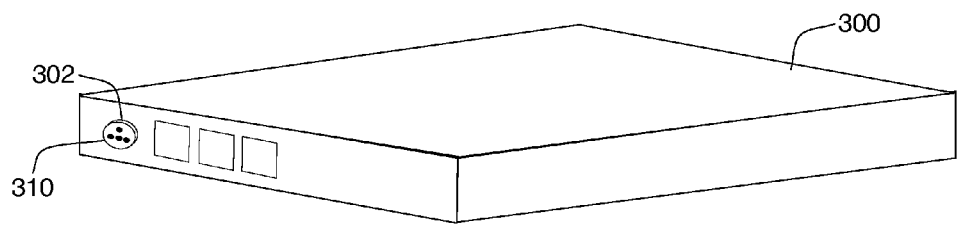
FIG. 3 is a schematic diagram showing the charging plug of FIG. 2 positioned in a power socket of a portable computer.

FIG. 3 is a schematic diagram showing a charging plug 310 that is plugged into a power socket 302 of a computer 300. Charging plug 310 includes plug tip (not shown) that is inserted into and makes an electrical connection with the power socket 302 of computer 300. In a preferred embodiment, charging plug 310 can be connected to power socket 302 at all times. In this embodiment the charging plug 310 exposed outside of the power socket 302 will be sufficiently low-profile to allow it to be left in the computer's power socket 302 for long periods of time without affecting portability of the computer 300. The charging plug 310 may be similar to the charging plug 240 of FIG. 2, with only the lip 246 being exposed on the outside of the computer 300. Some computers 300 will not be able to accommodate the cylindrical portion 244 of within their power socket 302. For these computers 300, the cylindrical portions 244 can be minimized or the lip 246 and cylindrical portion 244 can be merged into a single portion that is shown external to the power socket 302 of the computer 300 of FIG. 3.

Figure 4:
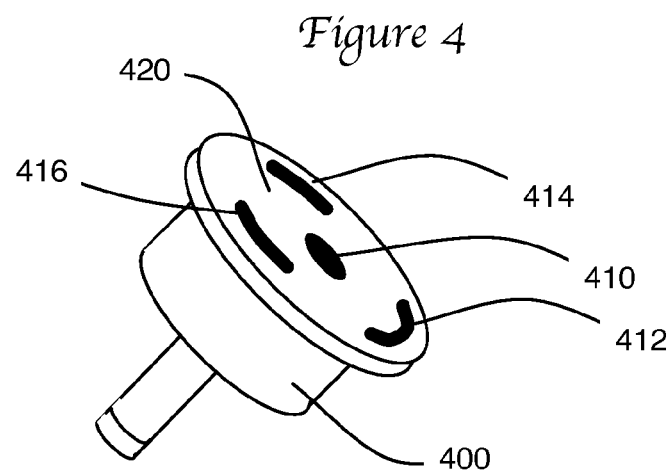
FIG. 4 is a perspective view of a second embodiment of a magnetic charging plug.

In the embodiment shown in FIG. 4, a charging plug 400 has four connection points 410-416 on its interface portion or side 420. FIG. 4 illustrates that the connection points 410-416 need not be circular but may be of other shapes as well. In FIG. 4, connection points 412-416 are generally arc-shaped and distributed around a round, center connection point 410 on the connection interface 420. In some embodiments, these points 412-416 are distributed evenly in a symmetrical manner. In the preferred embodiment, a corresponding cord connector (not shown) designed to connect with the charging plug 400 has connection points of similar shapes and configuration. In one embodiment, at least two of the connection points 410-416 are magnetic, with the poles of these connection points 410-416 exposed on the charging plug 400 being opposite of the poles exposed on the corresponding cord connector connection points. In addition, the two magnetic connection points 410-416 on the charging plug 400 also expose opposite poles to each other, which helps to ensure that the connection points of cord connector will be properly aligned with the connection points 410-416 when the cord connector engages with the charging plug 400.

Figure 5:
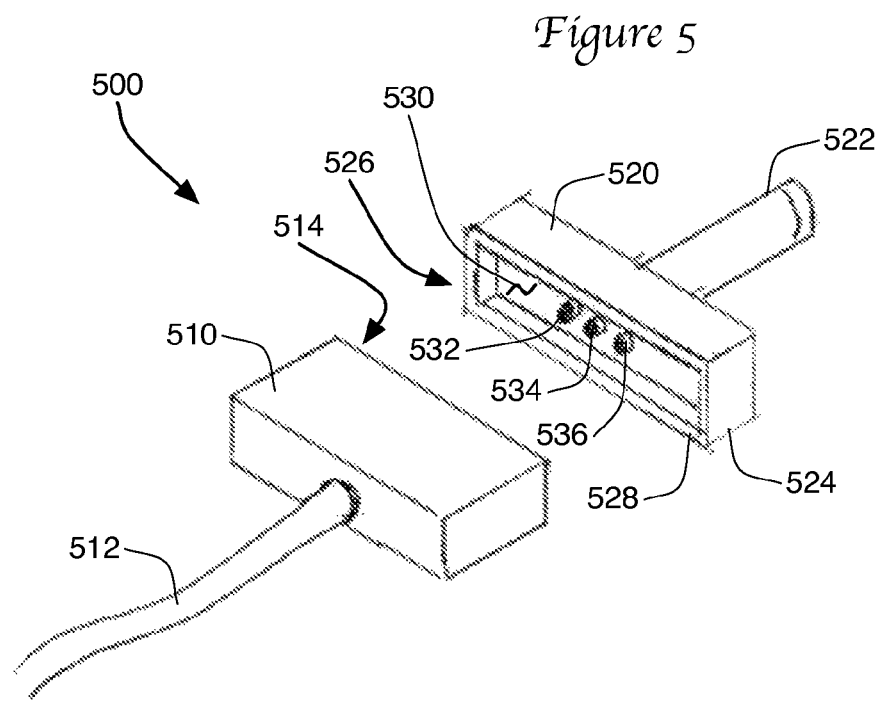
FIG. 5 is a perspective view of a third embodiment of a magnetic charging plug and cord connector.

FIG. 5 shows another embodiment of a coupling 500 consisting of a cord connector 510 attached to a power supply (not shown) through cord 512, and a charging plug 520 having a tip 522 designed to interface with a power socket of a computer (also not shown). In this embodiment, the cord connector 510 has the shape of a cuboid or rectangular prism.

The main body 524 of the charging plug 520 has a similar but larger shape. This allows the connection face 526 of the charging plug 520 to have an outer wall 528 and a recessed portion 530, where the recessed portion 530 is sized to receive the connection face 514 of the cord connector 510 within the outer wall 528. Inserting the cord connector 510 within the recess 530 of the charging plug allows a more secure fit and better alignment between the connection pins 532, 534, 536 of the charging plug 520 and the corresponding pins (not shown) of the cord connector 510. In other words, the cord connector 510 is sized so that it fits fairly closely within the recess 530, which ensures alignment of all connection pins.

Note that the coupling 500 shown in FIG. 5 includes only three pins. One way to implement this is to make the orientation of the cord connector 510 within the charging plug 520 irrelevant, which is accomplished by having the outer pins 532, 536 carry the same power signal (such as a positive voltage), while the inner pin 534 carries the second power signal (such as ground). If orientation is irrelevant, then no particular care needs to be taken on the poles exposed with the use of magnetic connectors 532, 536 as long as the magnets cause the cord connector 510 to be attracted to the charging plug 520. The embodiment 500 shown in FIG. 5 may also be accomplished with five pins without causing concerns over orientation, with the first and fifth pins sharing a first signal, the second and fourth pins sharing a second signal, and the middle carrying a third signal. The same technique could be used on any embodiment 500 using an odd number of pins.

Alternatively, all three pins 532, 534, 536 could carry separate power or data signals, in which case the cord connector 510 must be oriented correctly in order for the proper pins in the cord connector 510 and the charging plug 520 to align. In this case, the polarity of outer pins 532, 536 on the charging plug 520 must be opposite, as must be the polarity of outer pins on the cord connector 510. When the cord connector 510 is properly aligned and inserted into recess 530, the outer pins will attract each other. When the cord connector 510 is not properly aligned and inserted into recess 530, the outer pins will repel each other. By using the polarity of the magnetic pins to ensure alignment, it is not necessary to limit the embodiment 500 to only an odd number of pins.

Also note that the use of the recess 530 to help retain and position the two components 510, 520 of the coupling 500 could be accomplished with non-cuboid shapes. For instance, the cord connector 510 could have a circular cross section (such as that shown in FIG. 7), and could be designed such that the interface portion 514 fits within a circular recess 530 in the charging plug 520.

Figure 6:
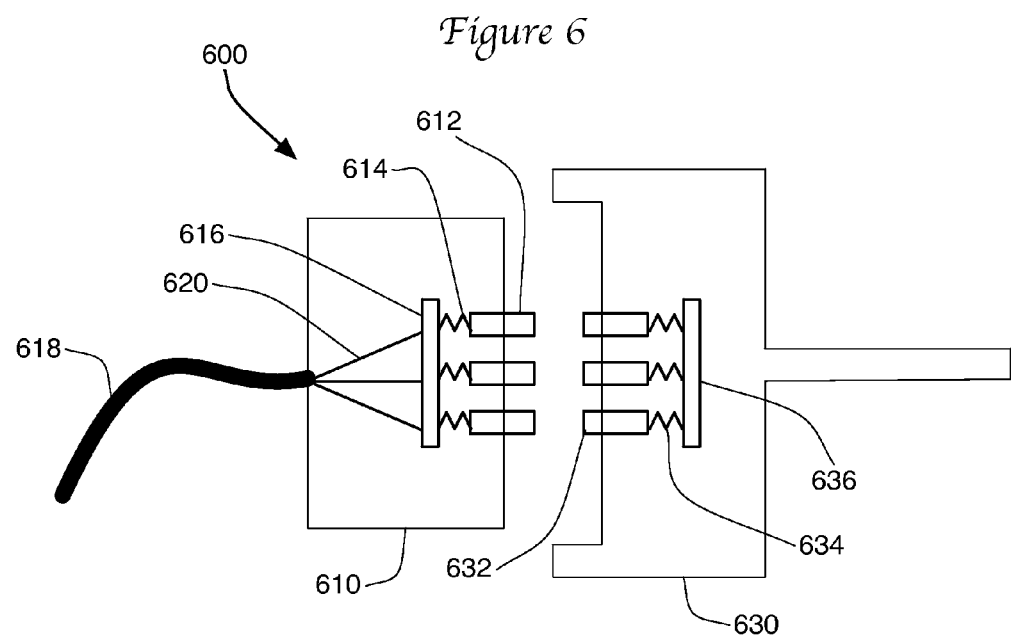
FIG. 6 is a schematic illustration of the interior components of a fourth embodiment of a magnetic charging plug and cord connector.

FIG. 6 shows an embodiment of the present invention that uses internal elasticity or springs to ensure a proper connection of the connection pins. In FIG. 6, the coupling 600 is shown with a cord connector 610 and a charging plug 630 shown in a cross-sectional schematic view to show the relevant internals of these components 610, 630. The cord connector 610 is shown with three pins 612, each of which is connected internally to a spring 614. The springs 614 connect with a base plate 616 within the cord connector 610. The base plate 616 is secured to the main body of the cord connector 610 to provide support for the springs 614. Each pin 612 is also electrically connected within the cord connector 610 to a cord 618 to the power supply. This electrical connection is illustrated in FIG. 6 with lines or wires 620 extending from the base plate 616 to the cord 618, although it is not intended for this embodiment to be limited to implementations where the electrical signals physically pass from the pins 612 to the cord 618 through springs 614 and the base plate 616. The charging plug 630 also includes three pins 632 connected via springs 634 to a base plate 636. Each pin 632 is also connected to elements in tip 638 to transfer electrical signals to a computer or other electronic device.

The springs 614, 634 allow each pin 612, 632 to move a small amount relative to their respective base plates 616, 636 independent of the movement of the other pins 612, 632. This ability for independent movement ensures a strong physical connection between corresponding pins 612, 632. If the pins 612, 632 are configured to be magnetically attracted to one another, some pins may be pulled toward their corresponding pins and away from their respective base plates 616, 636 causing their spring 614, 634 to expand. Because of improper alignment or construction, the attraction between the cord connector 610 and the charging plug 630 may also cause some pins 612, 632 to be brought together more closely than other pins 612, 632, which would lead to contraction of their springs 614, 634. Because of this ability for independent movement, variations in how the coupling components 610, 630 are constructed, in particular minor variations in pin positioning, will not keep the pins 612, 632 from making a strong physical and electrical connection with their partner pin.

The springs 614, 634 can be constructed as individual coil springs. In other embodiments, the springs 614, 634 are constructed using an elastic or springy material that, when subject to compression, will return to its original shape. Furthermore, the primary benefit of the springs can be obtained by providing springs 614, 634 in only one of the two components 610, 630. For instance, the pins 612 in the cord connector 610 may be connected to springs 614 to allow movement of the pins 612 relative to the remaining portion of the cord connector 610, while the springs 634 in the charging plug 630 could be omitted with the charging plug pins 632 remaining rigid relative to the rest of the charging plug 632. Alternatively, the springs 614 could be omitted from the cord connector 610 and instead be located within the charging plugs 630. As multiple charging plugs 630 may be included in a kit sold with a single power supply and cord connector 610, it may reduce cost to simplify the construction of the charging plugs 630 and locate the springs only within the cord connector 610.

In another embodiment, the pins 612, 632 are not magnetic. Instead, other magnets are embedded in the coupler components 610, 630 to provide a magnetic attraction between these components 610, 630. For instance, the base plates 616, 636 could be constructed from a rare earth magnet (such as neodymium). These magnets 616, 636 are arranged within the components 610, 630 so that the opposite poles of the magnets 616, 636 face each other when the cord connector 610 is attached to the charging plug 630. This attraction will urge the components 610, 630 together, forcing pins 612 in the cord connector 610 against pins 632 in the charging plug 630. The springs 614, 634 would allow independent movement of the pins 612, 632, ensuring positive engagement both physically and electrically between the pins 612, 632.

Figure 7:
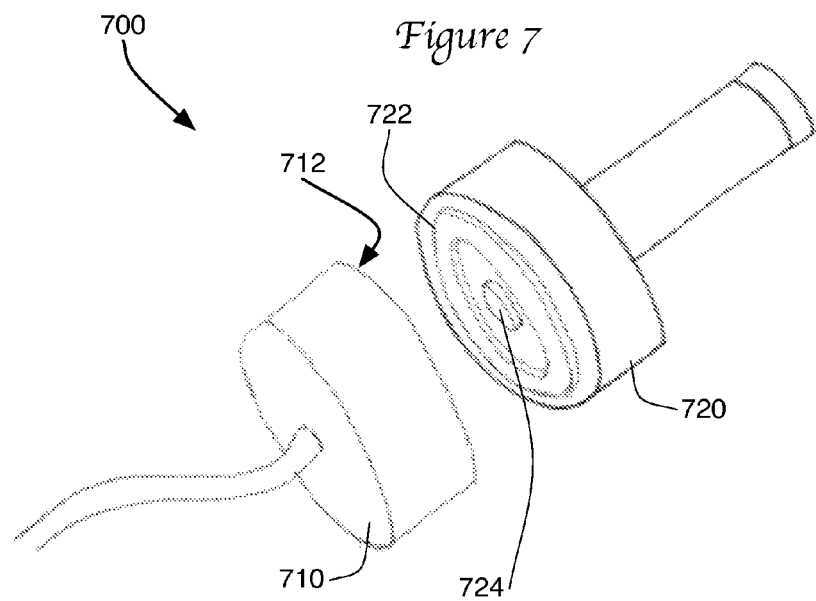
FIG. 7 is a perspective view of a fifth embodiment of a magnetic charging plug and cord connector.

FIG. 7 shows a coupler 700 having a cord connector 710 and a charging plug 720 that have circular cross sections. In this case, there are two pins 722, 724 shown on the charging plug 720. The first pin 722 is a donut shaped pin with an open center, which completely surrounds a center pin 724. The cord connector 710 has a similar or identical configuration of its two pins on connection face 712, which are not shown in FIG. 7. In one embodiment, one or both of the two pins 722, 724 are each magnetic so as to attract the corresponding pins on the cord connector 710. In another embodiment, the charging plug pins 722, 724 are not magnetic, but one or both of the pins on the cord connector 710 are magnetic, or other magnets in the components 710, 720 attract and hold the components together. One advantage of this embodiment 700 is that there is no need to orient the components 710, 720 with respect to one another. Regardless of orientation, the donut-shaped pin 722 will connect to the corresponding donut shaped pin on the cord connector 710.

In one variation of this configuration 700, the pin on the cord connector 710 corresponding to pin 722 is not donut shaped, but is located on the periphery of the connection face 712 of the cord connector 710 so as to ensure that the pin will always engage with the donut shape pin 722 of the charging plug 720. Furthermore, it is possible to construct the coupling 700 of FIG. 7 such that one of the two components 710, 720 contains a recess such as recess 530 to receive and help position the other component 710, 720 when the components 710, 720 are connected. Another variation utilizes springs such as those shown in FIG. 6 to allow freedom of movement of one or more of the pins used in the coupler 700.

FIG. 8 shows a method 800 for using one embodiment of the present invention, such as power adapter 100 shown in FIG. 1. As the power adapter 100 comes with a variety of charging plugs 140, 150, 160 with differing plug tips 142, 152, 162, the first step 810 of the process 800 is to identify the charging plug, such as plug 140, having a plug tip 142 that is appropriate for charging the user's computer. At step 820, the user inserts the plug tip 142 of the charging plug 140 into the power socket of the computer. This causes a physical connection between the power socket and the plug tip 142 that allows for the passage of electrical signals as is well known in the prior art. In addition, the insertion of the plug tip 142 will normally cause a frictional engagement between the tip 142 and the power socket that prevents the charging plug 140 from falling out of the computer without the user pulling the plug 140 from the socket. The charging plug 140 is designed to have a small profile when attached to the computer, as shown in FIG. 3, so as to allow the user to keep the charging plug 140 inserted even when the computer is not being charged.

At step 830, the power supply 110 is plugged into an AC power supply. Next, at step 840, the interface end 132 of the cord connector 130 is brought near the interface end 170 of the inserted charging plug 140. When this is accomplished, the magnets within the cord connector 130 and the charging plug 140 attract one another at step 850. This brings their interfaces 132, 170 into contact with one another and allowing the connection pins 134 of the interfaces 132, 170 to form an electrical connection. In the preferred embodiment, the attraction between the magnets also ensures that the two interfaces 132, 170 are properly aligned with respect to one another. If the interfaces 132, 170 are brought together without being properly aligned, the magnets will repel the interfaces 132, 170 apart. When the interfaces 132, 170 are connected, power is supplied from the power supply 110 to the plug tip 142 and the power socket of the computer (step 860).

The many features and advantages of the invention are apparent from the above description. Numerous modifications and variations will readily occur to those skilled in the art. For example, the universal computer power adapter could be altered to provide plugs for other electronic devices such as mobile devices, televisions, media players, etc. Since such modifications are possible, the invention is not to be limited to the exact construction and operation illustrated and described.

What is claimed is:

1. A power adapter, comprising:
   a) a power supply that supplies DC power over a cord;
   b) a cord connector attached to the cord having a cord connector face that presents at least two cord connection points that carry the DC power; and
   c) a connection plug having:
      i) a plug connection face having at least two plug connection points, the plug connection points positioned on the plug connection face so at to contact the at least two cord connection points when the plug connection face is in contact with the cord connector face, and
      ii) a tip electrically connected to the plug connection points and configured to interface with a power socket of a computer; and
   d) a plurality of magnets distributed between the cord connector and the connection plug having respective polarities and locations that
      i) attract the cord connector to the connection plug and
      ii) enforce a proper alignment between the cord connection points and the plug connection points.

2. The power adapter of claim 1, wherein the cord connector magnet and the connection plug magnet are rare earth magnets.

3. The power adapter of claim 1, wherein the cord connection points and the plug connection points are non-magnetic electrical conductors.

4. The power adapter of claim 1, wherein the cord connector face is a surface of a cord connector body, further wherein the cord connector body contains at least one spring attached to at least one of the cord connection points to allow movement of the connected cord connection point relative to the cord connector body.

5. The power adapter of claim 4, wherein the spring is secured to a base plate running behind the cord connection points.

6. The power adapter of claim 5, wherein the cord connector magnet comprises the base plate.

7. The power adapter of claim 1, wherein the plug connection face is a surface of a connection plug body, further wherein the connection plug body contains at least one spring attached to at least one of the plug connection points to allow movement of the connected plug connection point relative to the connection plug body.

8. A method of charging an electrical device comprising:
   a) inserting a plug tip of a charging plug into a power socket of the electrical device, the charging plug having
      i) a plug interface portion with a plurality of plug connection points exposed on the plug interface portion, and
      ii) a first plug magnet exposing a magnetic field from a first pole through the plug interface portion;
   b) bringing a power supply interface portion of a DC current delivery device proximal to the plug interface portion, the power supply interface portion having
      i) a plurality of power supply connection points configured to interface with the plug connection points of the plug interface portion, and
      ii) a first power supply magnet exposing a magnetic field from a second pole through the power supply interface portion;
   c) aligning the plug interface portion and the power supply interface portion so that the plug connection points align properly with the power supply connection points, and causing the first plug magnet to attract the first power supply magnet;
   d) holding the plug connection points against the power supply connection points via magnetic attraction between the first plug magnet and the first power supply magnet;
   e) supplying power to the power socket of the electrical device through the power supply connection points, the plug connection points, and the plug tip of the charging plug, wherein the charging plug has a second plug magnet exposing the magnetic field of the second pole through the plug interface portion and wherein the power supply interface portion has a second power supply magnet exposing the magnetic field of the first pole through the power supply interface portion; and f) before step c), misaligning the plug interface portion and the power supply interface portion so that the plug connection points do not align properly with the power supply connection points, whereby the first and second plug magnets repel the second and first power supply magnets, respectively.

9. The method of claim 8, wherein step d) further comprises the sub-step of moving at least one of the plug connection points relative to the plug interface portion against resistance of a spring.

10. The method of claim 8, wherein step d) further comprises the sub-step of moving at least one of the power supply connection points relative to the power supply interface portion against resistance of a spring.

11. A power adapter, comprising:
a) a power cord having a cord interface, the cord interface having a first, donut shaped cord connection point with an open center and a second cord connection point located within the open center of the first cord connection point;
b) a first connection plug having:
   i) a plug connection face having a first, donut shaped plug connection point with an open center and a second plug connection point located within the open center of the first plug connection point, and
   ii) a first tip electrically connected to the plug connection points and configured to interface with a power socket of a first electrical device; and
c) a magnet contained within at least one of the cord interface and the first connection plug, wherein magnetic attraction holds the plug connection points against the cord connection points.

12. The power adapter of claim 11, comprising a second connection plug having an identical plug connection face as the first connection plug, the second connection plug having a second tip configured to interface with a different configuration power socket of a second electrical device.

13. The power adapter of claim 11, wherein at least one of cord connection points and the plug connection points are connected to a spring to allow movement against resistance of the spring.

14. The power adapter of claim 11, wherein the magnet is formed separately from the plug connection points and the cord connection points, further wherein the plug connection points and the cord connection points are non-magnetic electrical conductors.

15. A power adapter, comprising:
a) a power supply that supplies DC power over a cord;
b) a cord connector attached to the cord having
   i) a cord connector face that presents at least two cord connection points that carry the DC power; and
   ii) a cord connector magnet; and
c) a connection plug having:
   i) a plug connection face having at least two plug connection points, the plug connection points positioned on the plug connection face so at to contact the at least two cord connection points when the plug connection face is in contact with the cord connector face,
   ii) a tip electrically connected to the plug connection points and configured to interface with a power socket of a computer, and
   iii) a connection plug magnet positioned to attract the cord connector magnet when the plug connection face is in contact with the cord connector face;
wherein
   i) the cord connector face is a surface of a cord connector body, further wherein the cord connector body contains at least one spring attached to at least one of the cord connection points to allow movement of the connected cord connection point relative to the cord connector body,
   ii) the spring is secured to a base plate running behind the cord connection points, and
   iii) the cord connector magnet comprises the base plate.

16. A power adapter, comprising:
a) a power supply that supplies DC power over a cord;
b) a cord connector attached to the cord having a cord connector face that presents at least two magnetic cord connection points that carry the DC power; and
c) a connection plug having:
   i) a plug connection face having at least two magnetic plug connection points, the plug connection points positioned on the plug connection face so at to contact the at least two cord connection points when the plug connection face is in contact with the cord connector face, and
   ii) a tip electrically connected to the plug connection points and configured to interface with a power socket of a computer,
wherein the plug connection points are positioned to attract the cord connection points when the plug connection face is in contact with the cord connector face.

* * * * *

UNITED STATES PATENT AND TRADEMARK OFFICE
CERTIFICATE OF CORRECTION

| | | |
|---|---|---|
| PATENT NO. | : 8,894,419 B1 | Page 1 of 1 |
| APPLICATION NO. | : 13/618940 | |
| DATED | : November 25, 2014 | |
| INVENTOR(S) | : Todd M. Buelow | |

It is certified that error appears in the above-identified patent and that said Letters Patent is hereby corrected as shown below:

In the claims

Column 8, Line 4
Delete "so at" and insert --so as--, therefor.

Column 10, Line 13 (approx.)
Delete "so at" and insert --so as--, therefor.

Column 10, Line 39 (approx.)
Delete "so at" and insert --so as--, therefor.

Signed and Sealed this
Fifth Day of April, 2016

Michelle K. Lee
*Director of the United States Patent and Trademark Office*